US007554333B2

(12) United States Patent  (10) Patent No.: US 7,554,333 B2
Morita  (45) Date of Patent: Jun. 30, 2009

(54) GROUNDING DETECTOR

(75) Inventor: Tsuyoshi Morita, Zama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 233 days.

(21) Appl. No.: 11/654,876

(22) Filed: Jan. 18, 2007

(65) Prior Publication Data

US 2007/0188948 A1    Aug. 16, 2007

(30) Foreign Application Priority Data

Jan. 19, 2006    (JP) .............................. 2006-011300

(51) Int. Cl.
*G01R 31/14*    (2006.01)
(52) U.S. Cl. .......................... 324/509; 324/503; 361/45
(58) Field of Classification Search ................. 324/509, 324/510, 511, 503; 361/45
See application file for complete search history.

(56) References Cited

U.S. PATENT DOCUMENTS 6,906,525 B2    6/2005  Suzuki

2002/0121902 A1*    9/2002  Suzuki ....................... 324/509

FOREIGN PATENT DOCUMENTS

| JP | 2002209331 | 7/2002 |
|---|---|---|
| JP | 2003250201 | 9/2003 |
| JP | 2003274504 | 9/2003 |
| JP | 2004053365 | 2/2004 |
| JP | 2004053367 | 2/2004 |

* cited by examiner

*Primary Examiner*—Vincent Q Nguyen
(74) *Attorney, Agent, or Firm*—Osha • Liang LLP

(57) ABSTRACT

A grounding detector includes a coupling capacitor connected at one end to an output terminal of a power supply and at another end to a measuring point, a voltage detector to detect a voltage amplitude generated at the measuring point, a pulse generator to generate a pulse signal at a prescribed frequency, to apply the pulse signal to the measuring point, and to generate a modified pulse signal having a modified frequency when the detected voltage amplitude is outside of a prescribed voltage range, the modified frequency being set below the prescribed frequency that existed when the voltage amplitude detected by the voltage detector is within the prescribed voltage range, and a grounding occurrence detection unit that detects the occurrence of grounding of the circuit based on the voltage amplitude detected at the measuring point during the application of the pulse signal to the measuring point.

9 Claims, 4 Drawing Sheets

GROUNDING DETECTOR

This application claims priority to Japanese Patent Application No. 2006-011300, filed on Jan. 19, 2006. The entire disclosure of Japanese Patent Application No. 2006-011300 is hereby incorporated herein by reference.

TECHNICAL FIELD

The present invention pertains to a grounding detector for detecting grounding between a high-voltage power supply installed on an electric car or various kinds of electric apparatuses that are connected to the high-voltage power supply and the body of the vehicle.

BACKGROUND

Usually, in the case of an electric vehicle, such as an electric car, a fuel-cell vehicle, or a hybrid electric car, a high-voltage power supply circuit is insulated from low voltage vehicular electric component circuits. For example, the high voltage power supply circuit may be a battery at a voltage of about 300V DC. The low-voltage vehicular circuits are typically in the range of 0 V DC~14 V DC. In a conventional grounding detector for detecting grounding of the high-voltage power supply, a coupling capacitor is connected at one end of the coupling capacitor to the positive or negative side of the high-voltage power supply circuit, and a square or rectangular waveform pulse is applied to a measuring point at the other end of the coupling capacitor in order to facilitate detecting the occurrence of grounding of the high-voltage power supply. Typically, in the environment of an electric powered vehicle, high frequency and low frequency noise becomes super imposed on the rectangular waveform pulse.

Japanese Kokai Patent Application No. 2003-274504 discloses a grounding detector in which the noise is removed using a band pass filter equipped with a high-pass filter and a low-pass filter. A grounding detector disclosed in that patent application that is designed to remove high-frequency and low-frequency noise not attributable to the rectangular waveform pulse that is otherwise superimposed on the voltage generated at a measuring point. The noise is removed using a band pass filter equipped with a high-pass filter and a low-pass filter. An offset circuit is used to superimpose a direct current element on the voltage after the noise is removed. When the high-frequency and low-frequency noise superimposed on the voltage generated at the measuring point is removed using the band pass filter, the direct current element is also removed, and the voltage output from the band pass filter becomes a voltage signal that oscillates around 0 V. However, because a control circuit, such as a CPU, is usually incapable of detecting a voltage lower than 0 V, an offset circuit is used to superimpose a direct current element onto the voltage after the noise has been removed so as to offset the voltage output from the band pass filter and to convert it into an electric signal in a voltage range (for example, 0 V~5 V) that the control circuit can read. Thus, the amplitude of the voltage that has been offset may be detected using an electronic device, such as a CPU. A grounding of the circuit connected to the power supply is detected by the CPU based on the amplitude value of the detected voltage.

SUMMARY

It has been found by the inventor that a grounding detector that requires a low-pass filter, a high-pass filter, and an offset circuit for superimposing a direct current element will result in requiring an up-sized circuit and an increased cost for the device.

The present invention provides an effective grounding detector that is both stable and uses an inexpensive circuit configuration relative to other grounding detector devices.

In one embodiment of the present invention, a grounding detector for detecting grounding of a circuit that is connected to a power supply includes a coupling capacitor that is connected at one end to an output terminal of a power supply. A voltage detector is operatively connected to the circuit that detects a voltage generated at a measuring point at the other end of the coupling capacitor. A pulse generator is connected that generates a pulse signal with a prescribed frequency, and applies the generated pulse signal to the measuring point. The pulse generator generates a modified pulse signal with a modified frequency when the voltage detected by the voltage detector goes outside of a prescribed voltage range, either higher than a maximum or lower than a minimum of the prescribed voltage range. The modified frequency is set below the frequency generated when the voltage detected by the voltage detector is within the prescribed range. A grounding occurrence detection unit detects the occurrence of grounding of the power supply circuit based on the amplitude value of the voltage detected by the voltage detector during the application by the pulse generator of the pulse signal to the measuring point.

According one embodiment of a grounding detector pertaining to the present invention, when the voltage detected by the voltage detector has gone outside of the prescribed range, the pulse generator adjusts (increases or decreases) the electric charge quantity that was charged on the coupling capacitor by setting the frequency of the pulse signal generated below the frequency established when the voltage detected by the voltage detector is within the prescribed voltage range so as to adjusts (increase or decrease) the voltage amplitude value input to the voltage detector in order to bring it into the prescribed voltage range. Therefore, according to one embodiment of a grounding detector, a band pass filter and an amplification circuit for increasing/decreasing (offsetting) the voltage range of the voltage amplitude value, which were required in the past, are no longer needed; and stable grounding detection can be realized using an inexpensive circuit configuration.

DETAILED DESCRIPTION

One or more embodiments of the present invention will be explained below with reference to figures.

Figure 1:
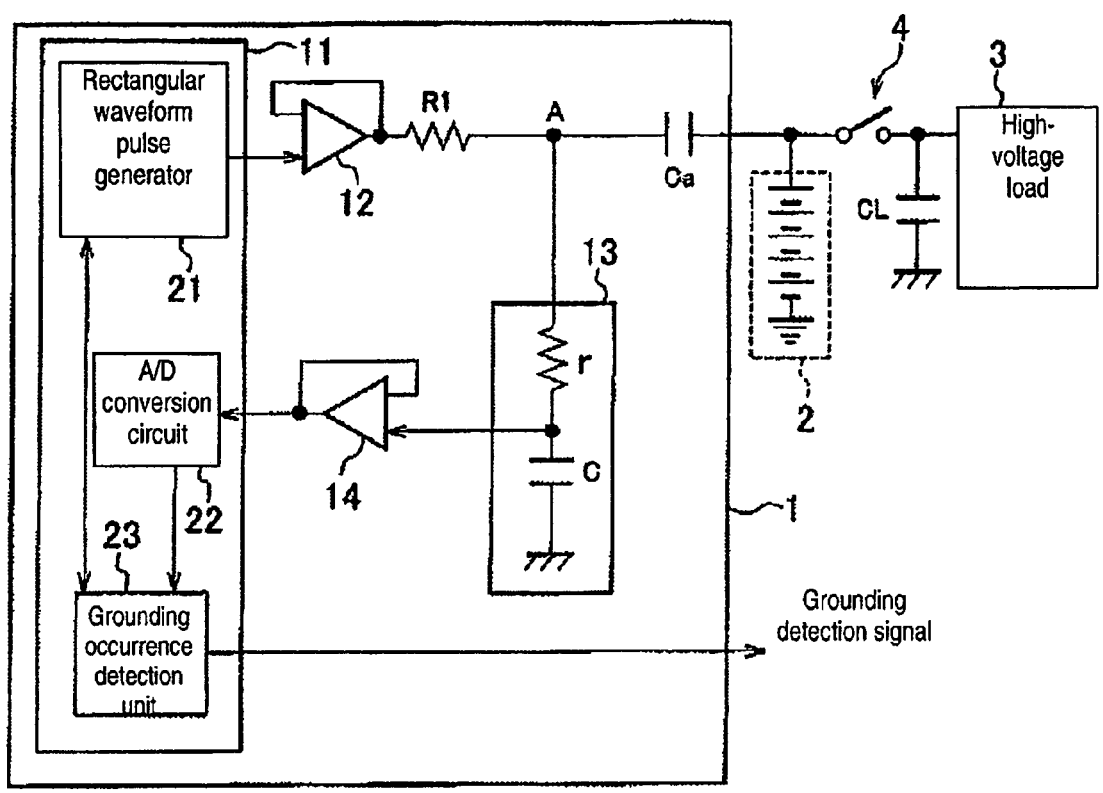
FIG. 1 is a block diagram showing a configuration of a vehicular component system that includes the grounding detector to which one or more embodiments of the present invention may be applied.

In one embodiment the present invention is applied to grounding detector 1 of a vehicle component system with the configuration shown in FIG. 1, for example.

Configuration of the Vehicle Component System

The vehicle component system utilizes a grounding detector 1 in order to detect the occurrence of grounding of a high-voltage system circuit. The high voltage system circuit (hereinafter "high-voltage system,"), includes a high-voltage battery 2, a high-voltage load 3, and a harness for connecting the high-voltage battery 2 to the high-voltage load 3. The grounding detector 1 is intended to detect grounding of the high voltage system accurately and stably. The grounding detector 1 has a prescribed voltage range in which detection can be accomplished. (For example a range of between a low voltage such as 0V and a high voltage such as E'V to be described more fully later; as for example, 0 V~5 V). When a voltage input (that may also be denoted as an input voltage, hereinafter) has gone outside of the voltage range (either higher or lower), the input voltage is returned to the voltage range in which the grounding detection can be carried out. That is, because a detectable voltage range is usually set for hardware such as a control circuit that may include a CPU, the detection or the ability to detect the voltage becomes disabled when the input voltage has gone outside of the voltage range. Thus, to overcome this situation, the input voltage is brought into the detectable voltage range when the voltage goes beyond the prescribed detectable range.

In one example, an inverter may perform switching control of a direct current from the high-voltage battery 2 so as to supply an alternating current to a motor or to an air-conditioning unit. In this example, when switch circuit 4 is in a conduction state there may be a significant load referred to as a high-voltage load 3.

The high-voltage load 3 supplies power from the high-voltage battery 2 to the motor. For example, in response to a request for generation of a driving force for an electric vehicle the high voltage load may be applied to the high voltage battery 2. The high-voltage load 3 is typically insulated from electric components such as low-voltage system circuits that, for example, may operate in a vehicle receiving the driving force. (Such system circuits may be denoted simply as "low-voltage system", hereinafter.) For example, one or more circuits operating at a voltage lower than the high-voltage system circuit may be installed on the electric vehicle and may be normally separated from the high voltage system using an insulating resistance.

The high-voltage battery 2 is connected electrically to high-voltage load 3 in order to supply power to high-voltage load 3. A switch circuit 4 is connected to the positive terminal of the high-voltage battery 2. The switch circuit 4 is opened and/or closed according to a control signal from a vehicular controller not shown in order to switch on and off the power to high-voltage load 3 from high-voltage battery 2.

Grounding detector 1 detects the voltage value at measuring point A. The voltage value changes according to the value of the insulating resistance of high-voltage battery 2 and is therefore indicative of and may be used to detect whether high-voltage battery 2, the high-voltage system on high-voltage load 3 side, and the low-voltage system are grounded. More specifically, according to one embodiment, the grounding detector 1 includes a coupling capacitor Ca that is connected to the output terminal (+) on the positive side of high-voltage battery 2, and to a resistor R1, a control circuit 11, an external noise removal circuit 13, and an amplification circuits 12 and 14 on the other side. It will be understood by those of ordinary skill in the art that, although coupling capacitor Ca is connected to the positive side output terminal (+) of high-voltage battery 2 in the present application example, it may be connected to the negative side output terminal (−) without departing from certain aspects of the invention.

Control circuit 11 in this embodiment supplies a pulse signal as a rectangular waveform voltage signal comprising high voltage (E) and low voltage (0) to measuring point A at one end of coupling capacitor Ca through the amplification circuit 12 and resistor R1. The wave form voltage is applied between resistor R1 and coupling capacitor Ca. The control circuit 11 also detects the voltage generated at the measuring point A. The control circuit 11 also detects grounding of the high-voltage system based on the amplitude value of the voltage detected. More specifically, the control circuit 11 is equipped with rectangular waveform generator 21 that outputs a pulse signal. The control circuit 11 is also equipped with an A/D conversion circuit 22, and a grounding occurrence detection unit 23, wherein the A/D conversion circuit 22 takes the voltage generated at measuring point A as an input via an external noise removal circuit 13. The A/D converter detects the input voltage (analog signal), converts the detected voltage into a digital signal, and outputs the digital signal. The grounding occurrence detection unit 23 detects grounding based on the digital signal output from A/D conversion circuit 22 (that is, the voltage detected by A/D conversion circuit 22). Here, the A/D conversion circuit 22 only converts the analog signal into the digital signal in order to make the detected voltage processable at the grounding occurrence detection unit 23, and it never changes the value of the detected voltage. In other words, the A/D conversion circuit 22 simply detects the voltage and outputs the voltage to the grounding occurrence detection unit 23, so that the signal input to A/D conversion circuit 22 and the signal output from A/D conversion circuit 22 will be expressed as voltages hereinafter. In one or more embodiments the grounding occurrence detection unit 23 may include hardware, software or combinations thereof.

When detecting grounding of the high-voltage system, the grounding occurrence detection unit 23 reads the voltage input from A/D conversion circuit 22 with respect to the pulse signal output from rectangular waveform pulse generator 21. The pulse signal during the grounding detection has a prescribed voltage amplitude value of E (such that a rectangular waveform signal comprises a low-voltage signal at 0 V and a high-voltage signal at E V) and with a prescribed frequency of about 5~20 Hz. The pulse signal is applied to measuring point A via a resistor R1 after it is amplified at amplification circuit 12. The pulse signal is then applied to an external noise removal circuit 13 since it is affected by the capacitance of coupling capacitor Ca and capacitance CL of the vehicle. The external noise removal circuit 13 comprises resistor r and a capacitor C that are connected in series, and the noise removal circuit functions as a low-pass filter LPF that removes high-frequency band elements (noise in high-frequency band elements not attributable to the pulse signal) contained in the voltage at measuring point A. Then, once past the external noise removal circuit 13, the voltage is amplified at an amplification circuit 14 and is supplied to the A/D conversion circuit 22. Furthermore, the voltage actually input to the control circuit 11 (input to A/D conversion circuit 22) will be denoted as an input voltage, and the voltage output from the A/D conversion circuit 22 (that is, input to the grounding occurrence detection unit 23) will be denoted as a measured voltage hereinafter.

The A/D conversion circuit 22 is capable of reading (measuring) only the input voltages that are within a prescribed range (voltages equal to or higher than 0 and equal to or lower than E'). The A/D conversion circuit 22 converts a read voltage and outputs it to the grounding occurrence detection unit 23 as a measured voltage. Therefore, A/D conversion circuit 22 outputs 0 when the input voltage is lower than 0, E' when it is higher than E', or the voltage it has detected when it is higher than 0 yet lower than E' as the measured voltage.

The grounding occurrence detection unit 23 stores grounding occurrence judgment values that are used for the purpose of determining whether the high-voltage system and the low-voltage system are grounded or not. The stored voltage amplitude values are compared with the voltage amplitude values of the measured voltage. When a pulse signal with the same amplitude and the same cycle is applied to measuring point A from rectangular waveform pulse generator 21, the amplitude value of the measured voltage is lower when the high-voltage system is grounded than when it is not grounded. Therefore, the grounding occurrence detection unit 23 compares the amplitude value of the measured voltage input from A/D conversion circuit 22 with a pre-stored, prescribed grounding occurrence judgment value in order to determine whether the high-voltage system is grounded or not.

Figure 2:
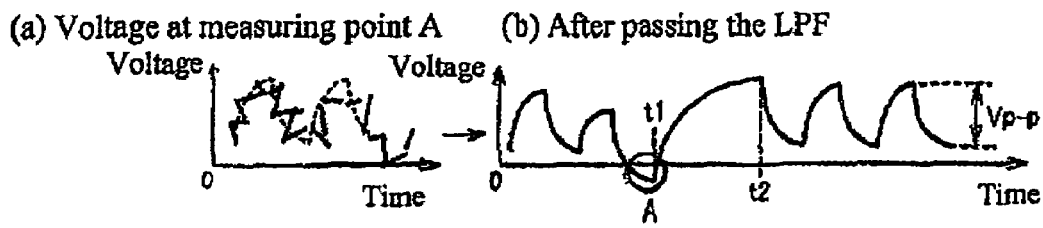
FIG. 2 shows voltage plots for explaining characteristics of a grounding detector to which the present invention may be applied, wherein (a) shows the voltage at measuring point A, and (b) shows the voltage after an external noise removal circuit has been passed.

That is, the grounding occurrence detection unit 23 stores grounding occurrence judgment values that are equal to or higher than the amplitude of the voltage measured when the high-voltage system is grounded, yet equal to or lower than the amplitude value measured when the high-voltage system is not grounded, and it compares the amplitude value of the measured voltage input from A/D conversion circuit 22 with grounding occurrence judgment values, whereby it determines that the high-voltage system is grounded when the amplitude value of the measured voltage is lower than the grounding occurrence judgment values. For example, in the case of a high-voltage system circuit in a vehicular component system, in which power generated by a fuel-cell is charged into high-voltage battery 2 so as to supply it to high-voltage load 3. In such a system, water may be generated when the fuel-cell generates power and the water can leak out to a part of the high-voltage system circuit, as for example when the vehicle undergoes a large movement or a rapid change in direction. In such an event, a capacitance may be created at a part of the high-voltage system circuit, and the voltage at measuring point A may take the waveform shown in FIG. 2(a). When the voltage at the measuring point A is put through external noise removal circuit 13 (low-pass filter LPF), and the measured voltage may becomes lower than 0 as indicated by A in FIG. 2(b). Thus, the voltage goes beyond the prescribed voltage range which is detectable by A/D conversion circuit 22, that is the range 0~E' (and this range will be also be denoted as the grounding occurrence judgment range hereinafter). The amplitude of the input voltage can no longer be detected accurately when the voltage goes beyond the grounding occurrence judgment range. At the other end of the prescribed voltage range, namely when the input voltage value input to A/D conversion circuit 22 has exceeded E', the amplitude value of the input voltage again can no longer be detected accurately. It will be understood by those skilled in the art that, whether the input voltage is lower than 0 or higher than E' is determined depending on whether the water had leaked on the positive electrode side or the negative electrode side of the high-voltage circuit.

In contrast, according to one embodiment of the invention, when the value of the input voltage input to A/D conversion circuit 22 has exceeded upper limit value E' of the grounding occurrence judgment range as shown in FIG. 3(b), the grounding occurrence detection unit 23 lowers the frequency of the pulse signal output from rectangular waveform pulse generator 21 as shown in FIG. 3(a) so as to fix the amplitude value of the pulse signal at 0 (low-voltage side) over time t11~t12. As a result, the capacitances of coupling capacitor Ca and capacitor C are discharged (that is, coupling capacitor Ca and capacitor C discharge) so as to lower the voltage at measuring point A. The discharge of the capacitors Ca and C are such that the voltage can be brought into the grounding occurrence judgment range (that is, equal to or lower than upper limit value E') by lowering the input voltage value supplied to A/D conversion circuit 22 gradually over time t21~time t22.

According to another embodiment of the invention, when the input voltage value input to A/D conversion circuit 22 has dropped below lower limit value 0 of the grounding occurrence judgment range as shown in FIG. 4(b), the grounding occurrence detection unit 23 lowers the frequency of the pulse signal output from rectangular waveform pulse generator 21 as shown in FIG. 4(a) so as to fix the amplitude value of the pulse signal at E (high-voltage side) over time t11~t12. As a result, the capacitances of coupling capacitor Ca and capacitor C are increased (that is, coupling capacitor Ca and capacitor C are charged over the indicated time period) so as to increase the voltage at measuring point A, so that the voltage can be brought into the grounding occurrence judgment range (that is, equal to or higher than lower limit value 0) by increasing the input voltage value supplied to A/D conversion circuit 22 gradually over time t31~time t32.

Next, the operation of grounding detector 1 with one or more embodiments will be explained with reference to the flow chart in FIG. 5.

During operation, in Step S1, the grounding occurrence detection unit 23 causes rectangular waveform pulse generator 21 to generate and output a normal pulse signal to measuring point A. Such a normal pulse signal may be a pulse signal within a prescribed frequency range (normal pulse signal), for example a prescribed frequency of 5~20 Hz or so, which is used to diagnose the occurrence of grounding. In Step S2, the grounding occurrence detection unit 23 determines whether the amplitude value of the measured voltage input from A/D conversion circuit 22 is lower than the prescribed grounding occurrence judgment value or not. In other words, the grounding occurrence detection unit 23 performs a grounding detection operation; that is, it determines that the high-voltage system is grounded if the amplitude value of the measured voltage is lower than the prescribed grounding occurrence judgment value, or that it is not grounded otherwise. Here, when it determines that grounding is present, the grounding occurrence detection unit 23 performs an announcement operation; that is, it outputs a grounding detection signal to an indicator or a speaker (not shown) and activates an alarm in order to alert the occurrence of grounding.

In Step S3, the grounding occurrence detection unit 23 determines whether the input voltage has exceeded upper limit value E' of the grounding occurrence judgment range or not. This determination is made by determining whether the measured voltage detected in Step S2 is stuck at upper limit value E' of the grounding occurrence judgment range or not (that is, whether the measured voltage has reached upper limit value E' or not). In Step S4, the grounding occurrence detection unit 23 determines whether the input voltage has become lower than lower limit value 0 of the grounding occurrence judgment range or not. This determination is made by determining whether the measured value detected in Step S2 has reached lower limit value 0 of the grounding occurrence judgment range or not (that is, whether the measured value has reached lower limit value 0 or not). If the grounding occurrence detection unit 23 determines that the input voltage is within the grounding occurrence judgment range, and the judgments in Step S3 and Step S4 are both "No," the process returns to Step S1 in order to continue with the grounding detection operation.

The process advances to Step S5 and thereafter if the grounding occurrence detection unit 23 determines that the input voltage has exceeded upper limit value E' of the grounding occurrence judgment range in Step S3, or the process advances to Step S16 and thereafter if the grounding occurrence detection unit 23 determines that the input voltage has dropped below lower limit value 0 in Step S4. In Step S5, grounding occurrence detection unit 23 stops the grounding detection operation carried out based on the measured voltage input from A/D conversion circuit 22. Here, processing for prohibiting the output of a grounding detection signal may be used instead of stopping the grounding detection operation itself during said processing.

Figure 3:
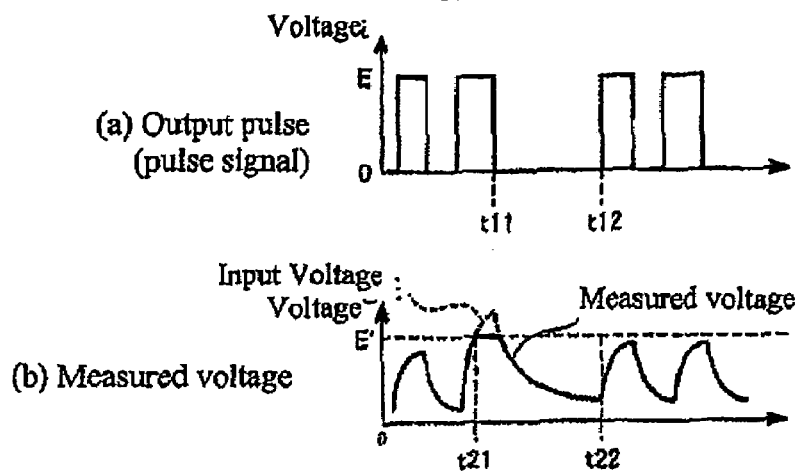
FIG. 3 shows measured voltage plots for explaining characteristics of the grounding detector to which the present invention may be applied, wherein (a) shows the measured voltage output from a rectangular waveform pulse generator, and (b) shows the measured voltage that has in some instances gone outside of an upper limit of a prescribe voltage range in which grounding occurrence judgment can be detected.

In Step S6, grounding occurrence detection unit 23 lets the rectangular waveform pulse generator output a modified pulse signal (this may also be denoted as measured voltage correction pulse signal L hereinafter) with the voltage value of the low-voltage side (for example, 0 V). As shown in FIG. 3, the measured voltage correction pulse has an output time longer than the output time of the normal pulse signal on the low-voltage side in a single cycle of a pulse signal with normal frequency. The output time of the measured voltage correction pulse signal L is preset in order to allow an input voltage in excess of upper limit value E' of the grounding occurrence judgment range to be brought back into the grounding occurrence judgment range (that is, into the range equal to or higher than 0 yet equal to or lower than E'). Thus, when the input voltage goes beyond the prescribed grounding occurrence judgment voltage range; a modified frequency pulse signal is generated. That is, when the input voltage has exceeded upper limit value E' of the grounding occurrence judgment range, the grounding occurrence detection unit 23 reduces the frequency of a modified pulse signal output from rectangular waveform pulse generator 21 to a modified frequency below the prescribed frequency of the normal pulse signal.

In Step S7, the grounding occurrence detection unit 23 lets rectangular waveform pulse generator 21 output the normal grounding detection pulse signal (normal pulse signal), and determines again whether the measured voltage is stuck at upper limit value E' of the grounding occurrence judgment range or not in Step S8, whereby the process returns to Step S1 if the sticking of the measured voltage at upper limit value E' has been solved, or the process advances to Step S9 if it has not yet been solved.

In Step S9 the grounding occurrence detection unit 23 lets rectangular waveform pulse generator 21 output measured voltage correction pulse signal L again and it determines again whether the measured voltage is stuck at upper limit value E' of the grounding occurrence judgment range or not (that is, whether the measured voltage input to the grounding occurrence detection unit 23 is at E' or not). In Step S10; if the measured voltage is still stuck at upper limit value E', the grounding occurrence detection unit 23 starts counting up the diagnostic counter in Step S12. The count value of the diagnostic counter indicates the duration of time during which the sticking of the measured voltage at upper limit value E' is detected. Alternatively, when the sticking of the measured voltage at upper limit value E' is solved in Step S10, the count value of the diagnostic counter is cleared in Step S11, and the process returns to Step S1.

In Step S13, the grounding occurrence detection unit 23 refers to the count value of the diagnostic counter counted up in Step S12 in order to determine whether the duration of time in which the measured voltage is stuck at upper limit value E' has reached a preset time or not based on the count value of the diagnostic counter. A time that allows a determination that the cause of the sticking of the measured voltage at upper limit value E' is not attributable to the high-voltage system, but is due to a failure of grounding detector 1 is preset for said preset time. If the duration of time in which the measured voltage is stuck at upper limit value E' has not yet reached the preset time, the grounding occurrence detection unit 23 repeats the processing from Step S9.

When the grounding occurrence detection unit 23 determines that the duration of time in which the measured voltage is stuck at upper limit value E' has reached the preset time, it clears the count value of the diagnostic counter in Step S14, and activates an alarm, such as an indicator and a speaker (not shown) in order to carry out an operation announcing the failure of grounding detector 1 in Step S15.

In addition, when the grounding occurrence detection unit 23 determines that the input voltage has dropped below lower limit value 0 of the grounding occurrence judgment range, and the measured voltage is stuck at the lower limit (that is, the measured voltage is at lower limit 0 of the measured voltage) in Step S4, it stops the grounding detection operation to be carried out based on the measured voltage input from A/D conversion circuit 22 in Step S16 in the same manner as in Step 5. Here, a process prohibiting the output of a grounding detection signal may be used instead of stopping the grounding detection operation itself during said processing.

Figure 4:
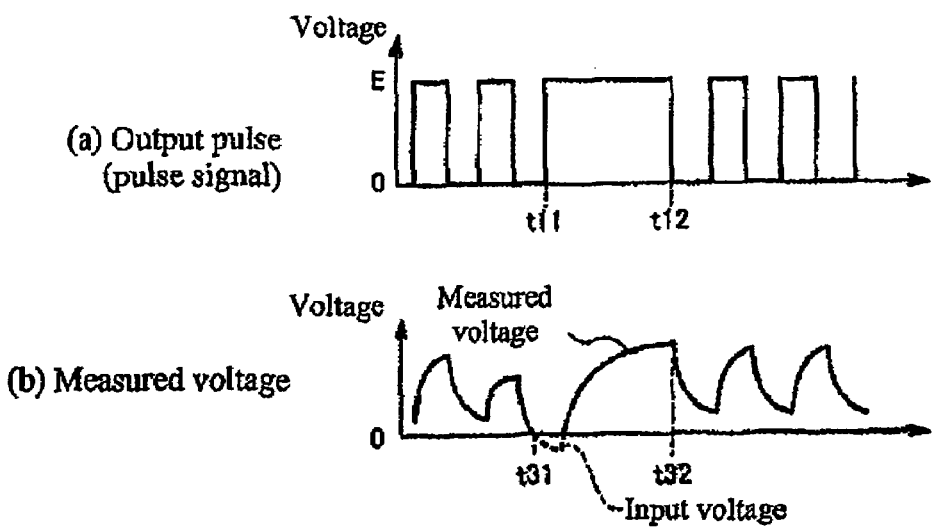
FIG. 4 shows measured voltage plots for explaining characteristics of embodiments of a grounding detector to which the present invention may be applied, wherein (a) shows the measured voltage output from the rectangular waveform pulse generator, and (b) shows the measured voltage that in some instances has gone below the lower limit of the grounding occurrence judgment range for the grounding detector

In Step S17, the grounding occurrence detection unit 23 lets rectangular waveform pulse generator 21 output a pulse signal (this will be denoted as measured voltage correction pulse signal H hereinafter) with the voltage value of the high-voltage side (for example, E V). As shown in FIG. 4, an output time longer than the output time of the pulse signal on the high-voltage side in a single cycle of a pulse signal with the normal frequency is preset for said measured voltage correction pulse signal H so that the input voltage lower than the lower limit 0 of the grounding occurrence judgment range can return to the grounding occurrence judgment range (that is, the range of 0-E'). That is, when the input voltage has dropped below lower limit value 0 of the grounding occurrence judgment range, the grounding occurrence detection unit 23 reduces the frequency of the pulse signal output from rectangular waveform pulse generator 21 to below the frequency of the normal pulse signal to thereby form a modified pulse having a lower frequency.

Next, the grounding occurrence detection unit 23 lets rectangular waveform pulse generator 21 output the normal grounding detection pulse signal (normal pulse signal) in Step S18, and it determines again whether the measured voltage is stuck at lower limit value 0 of the grounding occurrence judgment range or not in Step S19, whereby the process returns to Step S1 if the sticking of the measured voltage at lower limit value 0 has been solved, or the process advances to Step S20 if it has not yet been solved.

The grounding occurrence detection unit 23 lets rectangular waveform pulse generator 21 output measured voltage correction pulse signal H again in Step S20, and it determines again whether the measured voltage is stuck at lower limit value 0 of the grounding occurrence judgment range or not (that is, whether the measured voltage input to the grounding occurrence detection unit 23 is 0 or not) in Step S22, whereby it starts counting up the diagnostic counter in Step S22. The count value of said diagnostic counter indicates the duration of time during which the sticking of the measured voltage at lower limit value 0 is detected. Alternatively, when the sticking of the measured voltage at lower limit value 0 is solved in Step S22, the count value of said diagnostic counter is cleared in Step S21, and the process returns to Step S1.

In Step S24, the grounding occurrence detection unit 23 refers to the count value of the diagnostic counter counted up in Step S23 in order to determine whether the duration of time that the measured voltage is stuck at lower limit value 0 has reached a preset time or not based on the count value of the diagnostic counter. A time that allows a determination that the cause of the sticking of the measured voltage at lower limit value 0 is not attributable to the high-voltage system, but is due to a failure of grounding detector 1, is preset for said preset time. If the duration of time that the measured voltage has been stuck at lower limit value 0 has not yet reached the preset time, the grounding occurrence detection unit 23 repeats the processing from Step S20.

If the grounding occurrence detection unit 23 determines that the duration of time that the measured voltage has been stuck at lower limit value 0 has reached the preset time, it clears the count value of the diagnostic counter in Step S14, and activates an alarm, such as an indicator and a speaker, not shown in order to carry out an operation of announcement of the failure of grounding detector 1 in Step S15.

As such, with grounding detector 1, even if the measured voltage is stuck at upper limit E' or lower limit 0 of the grounding occurrence judgment range, that is, when the input voltage enters a state beyond the voltage range (equal to or lower than 0 or equal to or higher than E') detectable (readable) by A/D conversion circuit 22, the input voltage can be brought back into the grounding occurrence judgment range, so that the input voltage can be kept within the grounding occurrence judgment range, except with failure of grounding detector 1 itself.

Figure 5:
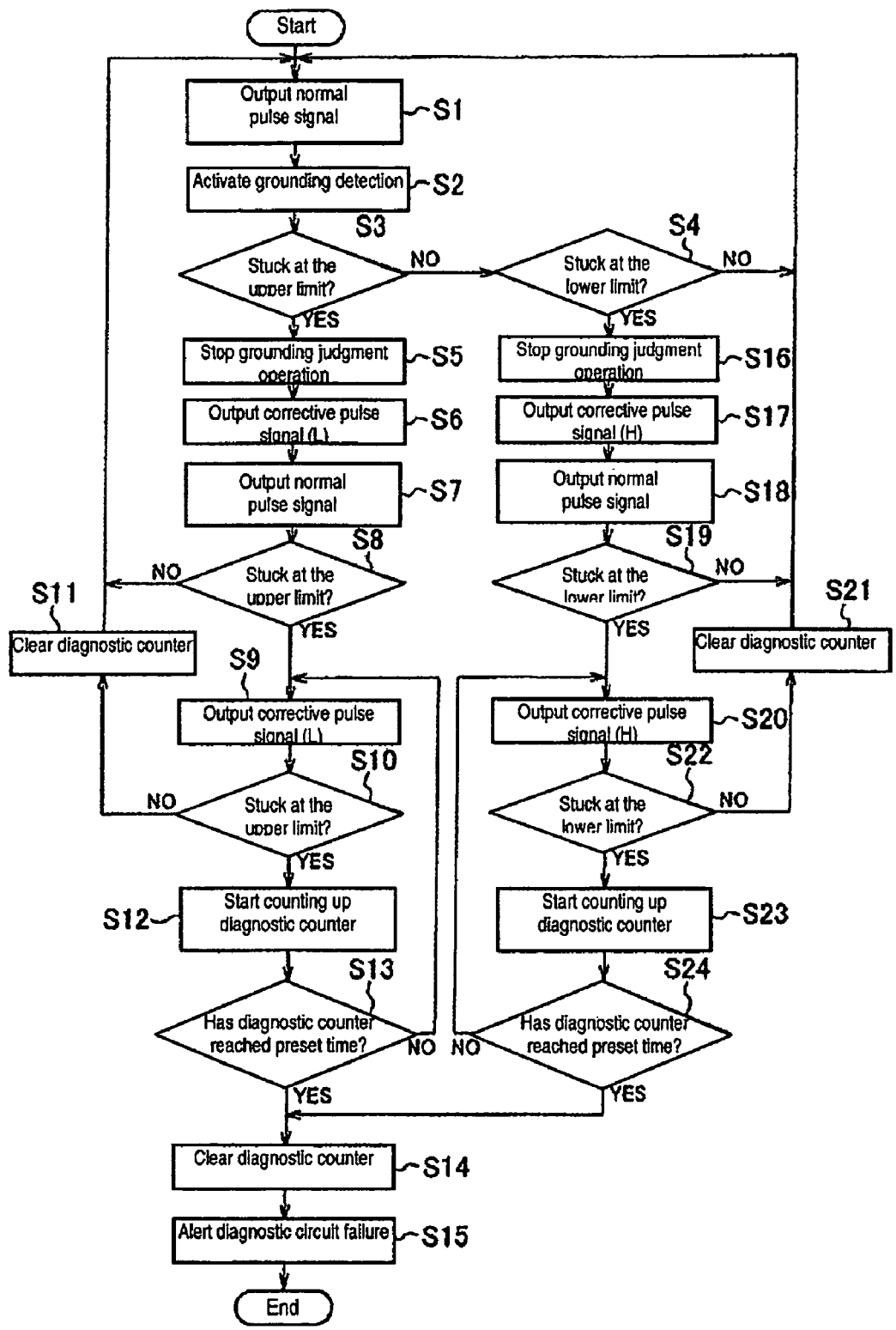
FIG. 5 is a flow chart for explaining operations of one or more embodiments of a grounding detector to which the present invention may be applied.
Figure 6:
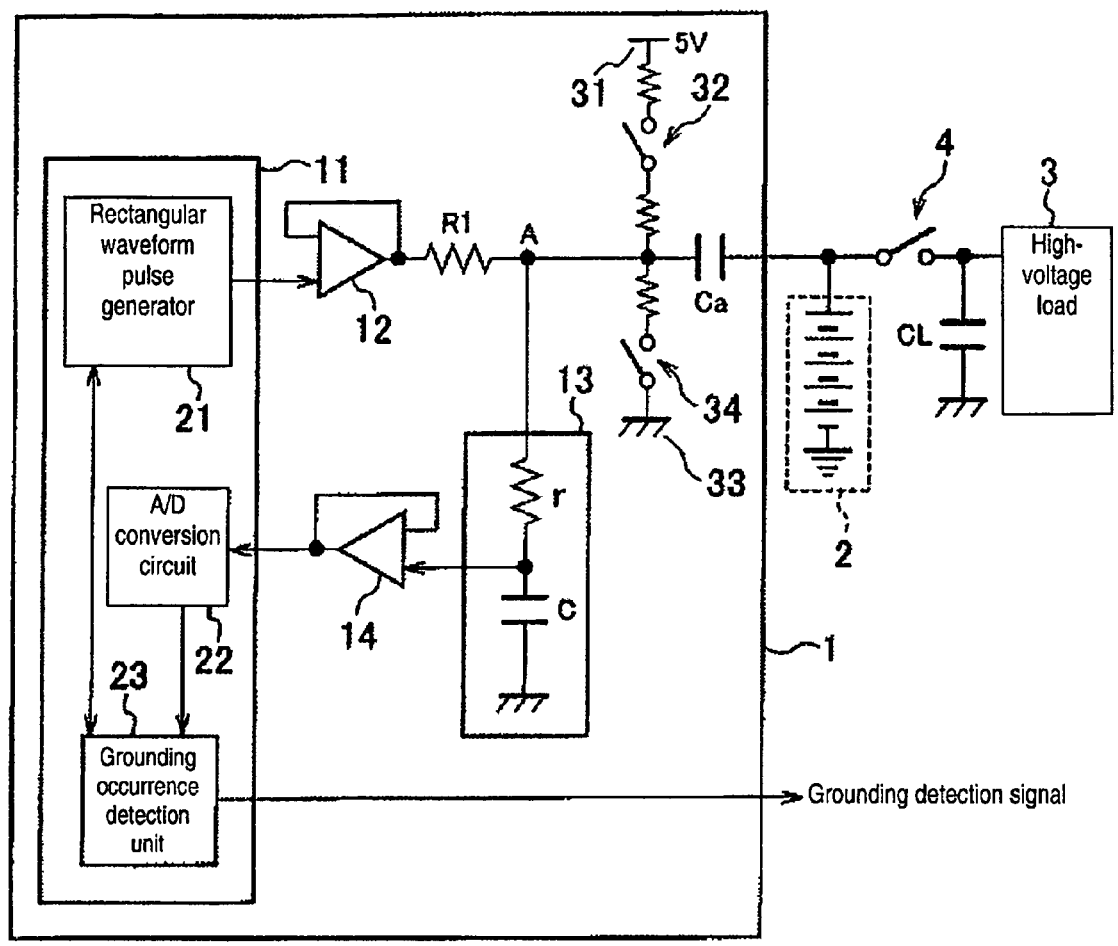
FIG. 6 is a block diagram showing another configuration of a vehicular component system that includes a grounding detector to which one or more embodiments of the present invention may be applied.

In an alternative embodiment, as shown in FIG. 6, grounding detector 1 may have a configuration capable of adjusting the capacitances of coupling capacitor Ca and capacitor C in place of the configuration for carrying out the processing in FIG. 5. In the grounding detector 1, power supply 31 and switch 32 are connected to the connection wire provided between measuring point A and coupling capacitor Ca, and ground terminal 33 and switch 34 are connected together. When sticking of the measured voltage at upper limit value E' is detected by the grounding occurrence detection unit 23, the grounding detector 1 turns switch 34 into a conduction state so as to release (discharge) the capacitances of coupling capacitor Ca and capacitor C through ground terminal 33. In addition, when sticking of the measured voltage at lower limit value 0 is detected by the grounding occurrence detection unit 23, it turns switch part 32 into a conduction state to let power supply 31 charge coupling capacitor Ca and capacitor C. That is, in the application example shown in FIG. 1 and FIG. 5, the frequency of the pulse signal output by rectangular waveform pulse generator 21 is modified or reduced when the measured voltage input to the grounding occurrence detection unit 23 is in excess of the grounding occurrence judgment range, which is the same as provision of a circuit that reduces the frequency of the pulse signal output from rectangular waveform pulse generator 21. As such, the measured voltage can be kept within the grounding occurrence judgment range at all times in the same manner as that described above. In the former case, rectangular waveform pulse generator 21 functions as a pulse generator that applies a pulse signal with a prescribed frequency to the measuring point; and in the latter case, rectangular waveform pulse generator 21, power supply 31, switch 32, ground terminal 33, switch 34, and a resistor function as a pulse generator that applies a pulse signal with a prescribed frequency to the measuring point.

Effect of the First Embodiment

As explained in detail above, according to grounding detector 1 to which the present invention is applied, because the frequency of the pulse signal to be generated is reduced by rectangular waveform pulse generator 21 when departure of the input voltage from the grounding occurrence judgment range is detected so as to bring the input voltage back into the grounding occurrence judgment range, the input voltage can be brought into the grounding occurrence judgment range without a high-pass filter or an offset circuit. Therefore, stable grounding detection can be realized using an inexpensive circuit configuration.

In addition, according to said grounding detector 1, the occurrence of errors attributable to a high-pass filter and an offset circuit become absent through elimination of the high-pass filter and the offset circuit to reduce errors in the measured voltage, so that highly accurate grounding detection can be realized.

Moreover, according to one embodiment of the grounding detector 1, because the grounding occurrence detection operation (grounding detection operation) is stopped while the measured voltage correction pulse is being output in order to bring the input voltage that has departed from the grounding occurrence judgment range back into the grounding occurrence judgment range, detection of the occurrence of grounding by mistake based on the amplitude value of the measured voltage while the measured voltage correction pulse is being output can be prevented.

Moreover, according to said grounding detector 1, because a decision is made that a failure has occurred in grounding detector 1 when the duration of time during which the operation for detecting the occurrence of grounding (grounding detection operation) is stopped has exceeded a prescribed time, the state in which the input voltage has departed from the grounding occurrence judgment range and a failure of grounding detector 1 can be distinguished.

The one or more embodiments describe are merely examples of the present invention. Thus, the present invention is not restricted to the specific embodiments, and it will be understood that the invention disclosed can be routinely modified in a variety of ways without going beyond the technical idea pertaining to the present invention. Therefore, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A grounding detector to detect the grounding of a circuit that is connected to a power supply, the grounding detector comprising:
   a coupling capacitor that is connected at one end of the capacitor to an output terminal of the power supply and that is connected at another end to a measuring point;
   a voltage detector that detects a voltage amplitude generated at the measuring point;
   a pulse generator that generates a pulse signal with a prescribed frequency, applies the pulse signal to the measuring point, and generates a modified pulse signal having a modified frequency when the voltage amplitude detected by the voltage detector goes outside of a prescribed voltage range, the modified frequency being set below the prescribed frequency that existed when the voltage amplitude detected by the voltage detector is within the prescribed voltage range; and
   a grounding occurrence detection unit that detects the occurrence of grounding of the circuit based on the voltage amplitude detected by the voltage detector at the measuring point during the application of the pulse signal to the measuring point.

2. The grounding detector of claim 1 wherein:
   the pulse signal comprises a rectangular waveform signal with a high output voltage value and a low output voltage value that is lower than the high output value wherein the high and low output values are output alternately in a prescribed cycle period defined by the prescribed frequency; and
   upon detecting that the voltage amplitude of the voltage detected by the voltage detector has exceeded an upper limit value of the prescribed voltage range, the pulse generator increases the cycle period of the pulse signal to generate the modified signal having the modified lower frequency by outputting the low output voltage for a period longer than the prescribed cycle period.

3. The grounding detector of claim 1, wherein:
   the pulse signal comprises a rectangular waveform signal with a high output voltage value and a low output voltage value that are output alternately in a prescribed cycle period; and
   upon the voltage detector detecting that the amplitude value of the voltage has dropped below a lower limit value of the prescribed voltage range, the pulse generator reduces the frequency of the pulse signal to generate the modified signal having the lower frequency by outputting the high voltage for a period longer than the prescribed cycle period.

4. The grounding detector of claim 1, wherein:
   the pulse signal comprises a rectangular waveform signal with a high output voltage value and a low output voltage value that are output alternately in a prescribed cycle period; and
   the pulse generator reduces the frequency of the pulse signal to form the modified pulse signal by outputting the low output voltage for a period longer than the prescribed cycle period upon detecting that the amplitude value of the voltage detected by the voltage detector has exceeded an upper limit value of the prescribed voltage range; and
   the pulse generator reduces the frequency of the pulse signal to form the modified pulse signal by outputting the high output voltage for a period longer than the prescribed cycle period upon detecting that the amplitude value of the voltage detected by the voltage detector has dropped below a lower limit value of the prescribed voltage range.

5. The grounding detector of claim 1, wherein:
   the pulse generator reduces the frequency of the pulse signal until the voltage detected by the voltage detector is within the prescribed range when the voltage detected by the voltage detector has gone outside of the prescribed voltage range.

6. The grounding detector of claim 5, wherein:
   the grounding occurrence detection unit stops the operation for detecting the occurrence of grounding while the pulse generator is reducing the frequency of the pulse signal.

7. The grounding detector of claim 6, wherein:
   the grounding occurrence detection unit determines that a failure has occurred in the grounding detector when the period of time during which the operation for detecting the occurrence of grounding has exceeded a prescribed time value.

8. A grounding detector for detecting the grounding of a circuit that is connected to a power supply, comprising:
   a coupling capacitor that is connected at one end of the coupling capacitor to an output terminal of the power supply, and connected at the other end of the coupling capacitor to a measuring point;
   a means for detecting the voltage generated at the measuring point at the other end of the coupling capacitor;
   a means for generating a pulse signal with a prescribed frequency, and for applying the generated pulse signal to the measuring point, and for generating a pulse signal having a modified frequency when the voltage detected by the voltage detection means has gone outside of a prescribed voltage range, wherein the modified frequency is below the prescribe frequency generated when the voltage detected by the voltage detection means is within the prescribed voltage range; and
   a means for detecting the occurrence of grounding of the circuit based on the amplitude value of the voltage detected by the voltage detection means during the application of either the pulse signal or the modified pulse signal to the measuring point.

9. A grounding detection method to detect the grounding of a circuit that is connected to a power supply, comprising:
   connecting a coupling capacitor at one end to an output terminal of the circuit and at another end to a measuring point;
   generating a pulse signal with a prescribed frequency within a prescribed voltage range and applying the pulse signal to the measuring point when the voltage detected is within the prescribed voltage range;
   detecting the voltage generated at the measuring point;
   applying the pulse at the prescribe frequency while the detected voltage is within the prescribed voltage range;
   generating a modified pulse signal with a frequency lower than the prescribe frequency prescribed of the generate pulse applied when the voltage detected at the measuring point is within a prescribed voltage range;
   applying the modified pulse signal to the measuring point when the voltage detected at the measuring point has goes above or below the prescribed voltage range; and
   detecting the occurrence of grounding of the circuit based on the amplitude value of the voltage generated at the measuring point when either the pulse signal or the modified pulse signal is applied to the measuring point.

* * * * *